April 20, 1937. O. MANTIUS ET AL 2,078,088
PROCESS OF RECOVERING SULPHURIC ACID FROM
SULPHURIC ACID SOLUTIONS OF SULPHATES
Filed Nov. 22, 1935

INVENTOR.
Otto Mantius
Ernest Mantius
BY
ATTORNEY.

Patented Apr. 20, 1937

2,078,088

UNITED STATES PATENT OFFICE 2,078,088

PROCESS OF RECOVERING SULPHURIC ACID FROM SULPHURIC ACID SOLUTIONS OF SULPHATES

Otto Mantius, Jackson Heights, N. Y., and Ernest Mantius, Englewood, N. J.; said Ernest Mantius assignor to said Mantius Application November 22, 1935, Serial No. 51,004

12 Claims. (Cl. 23—172)

This invention relates to a process of recovering sulphuric acid from sulphuric acid solutions of sulphates and is directed more particularly to the recovery of sulphuric acid used in the leaching of ores and pickling of steel where large amounts of iron sulphate go into solution. The invention may be employed in various industries, but is especially intended for the recovery of sulphuric acid in process work incident to the manufacture of titanium oxide, pickling of steel, etc., wherein the acid becomes saturated or nearly saturated with iron sulphate. In these uses, other impurities such as titanium, vanadium, chromium, calcium, manganese, magnesia, phosphorus, zirconium, cerium, nickel, copper, selenium, arsenic and other impurities, generally in the form of sulphates may also be found in the solution to be treated and these may also include organic impurities.

It is highly desirable in dealing with solutions of this kind to recover the sulphuric acid for reuse and attempts have been made to accomplish this result, but so far as we are aware, no satisfactory method has ever been evolved to this end. For example, it has been heretofore suggested to charge this solution to some form of retort where, by means of direct heat, all the water present in the solution is removed in the first step and the residue thereafter calcined, so that all the sulphates and also the free sulphuric acid are decomposed and reduced, liberating sulphur dioxide. This sulphur dioxide is then reconverted, by any of the well known chamber or contact methods, to sulphuric acid. The method described has been applied in present-day practice, but it is obviously open to very numerous disadvantages. It is highly expensive, requires the employment of expensive apparatus and there is much fuel and power required in the carrying out thereof, since by this method the solution must be supplied with sufficient heat to completely dehydrate the solution and, in addition, reducing agents and heat are required to reduce and decompose all the sulphates. For these reasons, much research has been carried on with a view to obtaining an economical procedure and one which will give satisfactory results.

For example, since it is a well established fact that the solubility of the sulphates contained in the solutions previously referred to, decreases with an increase of acid concentration, it has been heretofore suggested that the recovery of the sulphuric acid might be accomplished, from a solution of the character referred to, through concentration to 78% or higher and subsequent separation of the acid from the solids which come out of solution during concentration. It is essential to attain a moderate degree of acid concentration, such as 78% or higher, in some cases, in order that a sufficient quantity of the undesirable sulphates in the solution are rendered insoluble, leaving an acid of very low sulphate content which can be re-used for process work. The above method of acid recovery has been attempted by others using different types of concentrators and varying temperatures and pressures. These prior attempts, however, have met with failure because prior experimenters in this field have not discovered or appreciated the real problem involved, nor have they found a solution thereof. In every case, they have attempted to concentrate without due consideration or an understanding of such problem, and, as a result, the concentration has been such that the acid could not be separated from the solids. Invariably the soluble sulphates have been precipitated in the form of fine solid particles, so minute and in such large quantities that it is practically impossible to separate them from the acid. They will not settle out without occluding excessively large quantities of acid, and, if attempts are made to filter, they clog the pores of any filtering medium that could be employed for acid of such a concentration. Usually, prior attempts to concentrate solutions of the character under consideration for the purposes stated have resulted in a viscous slurry for which no adequate means is known for proper separation of the solids from the acid. For these reasons, the recovery of the acid through steps of concentration and separation has been practically concluded to be impossible and, as a result, the calcining method referred to above is the only operative one known prior to this invention.

As a result of prolonged experimentation and research we have discovered a method for recovering sulphuric acid from these sulphate solutions by means of concentration and, subsequently, separation of the acid from the solids which come out of the solution. We believe this method to be more practical and economical than the calcining method referred to above, since in our process the apparatus required is cheaper and the fuel and power requirements are less, since only partial concentration of the acid is required instead of complete dehydration followed by reduction and decomposition of the sulphate. In contrast to the methods employed previous to this invention our methods of concentration have produced concentrates in which we were able to effect a separation of the acid from the solids.

We have discovered that the successful separation of the solids from the acids depends largely upon the physical properties and the state of the solids and we have further discovered that when these solids are placed in a proper physical state, in accordance with this invention, they may be efficiently separated from the acid in an economical manner to permit of practical recovery of the sulphuric acid content of high percentage.

We have found in the course of our experiments, by examining the slurry of acid and solids at various points of acid concentration, that as the acid concentration increases, the slurry becomes more viscous and slimy and the solid particles which come out of solution are very fine instead of granular. These fine particles are not readily separated from the acid. We have discovered, however, a method whereby acid of high degree of concentration can be recovered without encountering the difficulties in separating the acid from the fine solids which come out of solution at high acid concentrations.

This method will be more fully described hereafter, but generally speaking, the underlying principle of our invention consists in first partially concentrating under a vacuum the acid solution, in proper apparatus and under proper conditions of temperature and pressure, up to a point where a large proportion of the sulphates come out of solution in the form of relatively coarse granules which can be readily separated from the acid; but the concentration is kept below the point where the sulphates begin to come out of solution as very fine particles which cannot be readily separated from the acid. After this first partial concentration, the acid is readily separated by decantation from the solids which settle in a suitable vessel. The clear acid is then concentrated to the desired acidity. During this concentration, which is carried on under a vacuum, the remaining relatively small quantity of sulphates come out of solution in the form of very fine particles which settle very slowly and occlude many times their own weight of acid. However, it must be noted that the actual quantity of these fine solid particles is very small relative to the quantity of acid and, therefore, the latter can be separated by decantation, leaving a thick slurry of fine solids and acid. This slurry is mixed with the acid and coarse, granular solids resulting from the first step of the concentration, referred to above, and we have discovered that this mixing of the fine particles with a large proportion of coarse granular particles, does not interfere with the stratification of the mixture into a clear acid layer superimposed on the solids.

After this stratification step, the solids and acids may be separated from one another in a simple and efficient way, either by decantation or filtration, as will be hereinafter more fully explained.

We have thus discovered and demonstrated that it is possible, by proceeding according to the process of this invention, to recover the acid from a solution of the character herein under consideration by properly conducted steps of concentration followed by appropriate separation steps. One very important factor, however, is that we produce a minimum number of fine particles and thus are able to handle the precipitated solids in an efficient manner to produce, as an end product, an acid of the desired concentration with a minimum amount of impurities.

We have discovered that the concentration step is one of great importance for we have demonstrated that if the temperature at which the concentration is carried out is too high or the concentration is proceeded with to a too great degree that it is impossible to perform the subsequent separation of the acid from the solids. The concentration is preferably not greater than approximately 60% and is preferably somewhere between 55 and 60% that the temperature range during this concentration should be that wherein the solids come out of solution in the form of relatively coarse granular particles. This concentration step must be carried on in a vacuum concentrator, wherein a vacuum above 25" is maintained, and at temperatures not exceeding 200° F. The figures given are not to be understood as limiting the invention in this connection, but practical operation has shown that, as the acid concentration increases, the subsequent separation of the acid from the solids becomes increasingly difficult, and, if the concentration is decreased, more sulphates remain in solution and in the second step of concentration are precipitated as fines which are difficult to separate from the acid. Furthermore, if the temperature is materially raised above that referred to and under the conditions stated there is produced an increasing number of fines and a tendency to a viscous, slimy slurry, from which separation of acid is difficult. Moreover at higher temperatures undesirable oxidation takes place.

By concentrating the solution as stated, the solids are rendered readily separable through the employment of appropriate subsequent decanting or filtration steps or both as later steps in the method of this invention, so as to deliver as an end product sulphuric acid at a relatively high percentage of concentration. This end product, sulphuric acid, is clear in color and contains at most a negligible quantity of dissolved solids.

Features of the invention, other than those specified will be apparent from the hereinafter detailed description and claims when read in conjunction with the accompanying drawing.

The accompanying drawing shows different forms of apparatus for carrying out the process of this invention, but the apparatus lay-outs there shown are to be understood as illustrative, only, and not as defining the limits of the invention and that the apparatus may be changed or modified as may be desired within this invention.

Figure 1 is a diagrammatic showing of one form of system for carrying out the process of this invention.

Figure 2 is a like view illustrating a modified form of system.

In the accompanying drawing, for the purpose of concrete illustration and example, we have shown the process of this invention as carried out in the reclamation of sulphuric acid from by-product solutions incident to the manufacture of titanium oxide and the following description sets forth specific examples of operation, at times giving the temperatures and percentages by way of example appropriate to the process of this invention as thus carried out, but we wish it clearly understood that this disclosure is by way of illustration only and that these factors or details of control may be varied as will be apparent to those skilled in the art without departing from the invention.

Referring first to Figure 1 of the drawing, we will assume, by way of example, that a by-product solution containing sulphates and having an acid concentration of approximately 24% is contained in a weak acid storage tank 1. This tank has a piping connection 2 with an indirectly heated vacuum concentrator or evaporator 3 of which there may be one or a battery as desired. The solution is continuously fed from the tank 1 through the pipe 2 into the concentrator 3, where it is concentrated by indirect heat, the contents of the concentrator being agitated.

The solution fed into the concentrator will embody a relatively large percent of sulphuric acid and in solution therewith relatively large quantities of iron sulphate with smaller proportions of other sulphates. The purpose of the process step carried out in the concentrator 3 is to produce a concentration suitable for subsequent separation of solids which come out of solution, as hereinbefore stated. Consequently in carrying out this step considerable care should be exercised in order to obtain the desired concentration under optimum conditions. In this step, therefore, it is our purpose to concentrate the solution under such conditions that the dissolved sulphates will come out of solution as the acid concentration is increased, and will take on such form that the acid may be readily separated therefrom. We have found that, if the concentration is carried too far, a viscous and slimy slurry will result, whereas if not carried on far enough, a sufficient number of the dissolved sulphates will not come out of the solution and will therefore be precipitated in a second concentration step, hereinafter described, during which second concentration step, they will come out as very fine particles which are extremely difficult, if not impossible, to separate. This concentration should therefore be short of that point wherein a viscous and slimy slurry will result, but should be carried on to a point wherein a sufficiently great amount of the dissolved solids are precipitated from the solution, so as not to cause difficulty in the later steps of the process. In other words, we carry out this concentration step in such manner that we can remove from solution all of the solids possible without proceeding so far as to produce a condition wherein subsequent separation cannot be properly carried out.

By way of concrete example, we may use in this connection a vacuum concentrator with upwardly of 25 inches of vacuum and we have found that an optimum concentration for the solution stated, is between 55 and 60% free sulphuric acid and we have also found that this concentration can be successfully carried out at a temperature under 200° F. A very satisfactory operating temperature has been found to be 190° F., but this temperature is not critical and the invention is not limited to these conditions of temperature, pressure or concentration. In any event the step of the process carried out in the concentrator 3 produces as an end product of this step a slurry or mixture of sulphuric acid and sulphates in a solid form. The solids found in suspension are granular and quite uniform in size and of a character well adapting them to settle out of the solution when such settling is permitted. The granules thus produced are ferrous sulphate monohydrate crystals (see Seidell, 2nd edition, vol. 1, page 343). Emulsions will be entirely absent. The agitation within the concentrator 3 will of course preclude a settling of the solids referred to, so that the said slurry or mixture may leave the concentrator 3, preferably through an overflow pipe 4 to be received into a cooling tank 5, wherein the slurry is maintained in a state of agitation to preclude settling out of the solids.

From the cooler 5, this slurry is fed through pipes 6 which include a pump 7 to one or more settling tanks 8 and 8'. Any number of these tanks 8, 8', etc. may be provided, but two are shown as illustrative. The slurry is fed first to the tank 8 until the desired charge has been received into the tank, whereupon the valve in the pipe line 6 leading to the tank 8 is shut off and the slurry fed to the tank 8', while the contents of the tank 8 are permitted to remain at rest in order that stratification may take place. After sufficient time has elapsed, the batch in the tank 8 will effectually stratify and the solids contained therein will settle out, and the acid, in substantially clear state, will form a superimposed stratum and can be decanted off through a decanting pipe 9 by means of a pump 10 which forces the decanted acid through a pipe 11 to an acid tank 12. During this operation, a valve 13 is open while the valve 14 is closed. By this method the stratified sulphuric acid is removed from the settling tank 8 leaving therein a residue of solids with occluded acid. The acid thus occluded will have a concentration, in the example given, of say 55 or 60%. A considerable amount of this acid may be recovered by next carrying on a repulping operation in the tank 8. This may be accomplished by feeding weak acid from the storage tank 1 through a pipe 15 into the settling tank 8 at 16, in predetermined quantities, with attendant pneumatic or mechanical agitation, so as to intimately admix the weak acid, thus fed, with the sediment of solid sulphates and occluded acid contained in the tank.

After mixing is complete, the slurry is permitted to settle and stratify, after which the acid is decanted off through pipe 9 by way of pump 16 and pipe 17 to a decanted acid storage tank 18, during which operation the valve 13 is closed and the valve 14 opened. At the conclusion of this operation, the solid precipitates in the settling chamber 8 will occlude substantially the same quantity of acid as before, but the acid now occluded will be a relatively weak acid in contradistinction to the stronger acid which has been decanted off and stored in the tank 12, although it will be stronger than the acid in the tank 1.

In practice this repulping operation may be repeated as many times as desirable in order that the amount of $H_2SO_4$ recovered may be at a maximum, although there is of course a point in this repulping operation beyond which it cannot be economically carried out. It may be here noted that during stratification or settling periods with respect to the tank 8, the tank 8' may be decanted and refilled in order that the process may be, in effect, a substantially continuous one.

After the repulping operation or operations have been carried on as stated, the tank 12 contains the thus far recovered acid, while the settling tanks 8 and 8' contain the residue of this operation. This residue may be treated in different ways. To facilitate its removal from tank 8, some further acid is introduced through the pipe 15 into the tank 8 to give the mass mobility and to permit it to be pumped. As shown in Figure 1, the valve 50 is now opened and the residue fed through a pipe 19, including a pump 20, to a slurry tank 21 wherein agitation is constantly maintained to preclude settling. From the tank 21 the slurry is fed by a pump 22 through a line 23 to any filter, preferably a rotary vacuum filter, where a cake of sulphate is produced. This cake is low in moisture and can be readily removed from the surface of the filter and conveyed by standard conveyors to a contact or chamber acid plant where the sulphate is converted into sulphuric acid. During filtration the cake of sulphate becomes quite dry, but still contains some acid. The amount of this acid can be reduced to a minimum, if desired, by spraying the cake with some of the weak acid from the tank 1 supplied through pipes 15 and 24 and which latter pipe includes a pump 25. The weak acid is thus fed to a suitable sprayer 26 which delivers the same to the acid cake.

As an alternative procedure, we may, if desired, supply to the sprayer 26 a saturated solution of iron sulphate with a low acid content delivered from any suitable source. In either case, the result is that the more concentrated acid in the filter cake is displaced and recovered. It may be drawn off by a suitable vacuum pump into a separating chamber 27, from whence it is delivered through pipe 28 to a receiver 29. From the receiver the pump 30 feeds the filtrate through a pipe 31 to a filtrate tank 32. The filtrate from the tank 32 may be returned through pipes 33, 15 and branch pipe 34 to the storage tank 18. During this operation, the valves 36, 37 and 38 are closed, while the valves 35 and 39 are open. The acid in the tank 18 may be subsequently fed from this tank to admix with weak acid solution from the tank 1 as the latter is fed to the concentrator 3.

As a result of the steps thus far described, there has been recovered in the tank 12 an appreciable amount of sulphuric acid of a concentration of say 55%. The subsequent steps in the process consist in treating this acid for further concentration and separation. To this end the thus concentrated acid is fed from the tank 12 to a vacuum concentrator 40 which may be a single concentrator or battery thereof, so as to permit of continuous operation. The purpose of this concentrator is to concentrate the acid to the desired concentration, such, for example, as 80% or higher as may be desired.

The concentrator 40 is of the vacuum type and, although the conditions to be adhered to in this step are not critical, we employ a vacuum of at least 25" and with temperatures of 250° F.–300° F. After being concentrated here the acid is fed to a cooling tank 41 wherein it is kept in constant agitation and from which it is fed by a pump 42 to one or more settling chambers 43. The material in the settling tank 43 is permitted to settle and stratify and the acid is decanted through a decanting pipe 44, through a pump 45, to be discharged as a final end product constituting recovered concentrated sulphuric acid.

It is to be noted that when acid is concentrated in the concentrator 40 as described, there will be some solids present. These solids of course pass with the concentrated acid from the concentrator 40 to the tank 43 and in this separator tank 43 all the solids which remain in suspension are settled out so that the decanted acid is a clear liquid with negligible sulphates in solution and of a degree of purity enabling it to be used for process work. It may be discharged at a concentration equal to or greater than that necessary for such process work as may be desired. The residue from the final separation operation in the settling tank 43 will occlude of course some of this highly concentrated acid and this residue should be returned by a pump 46 through a pipe 47 to the settling tanks 8 and 8' to be mixed with a subsequent slurry coming from the concentrator 3. In order to facilitate the pumping of the residue from the tank 43 through pump 46 a sufficient amount of acid should be fed from the tank through pipe 48 to render the residue mobile.

It will of course be understood that the residue from this final separation in the tank 43 will include some solids in the form of fines, but since the bulk of solids has been removed in the tank 8 by the first separation step, the amount of fines coming out in the second step is very small. In fact these fines constitute such a small percentage of the contents in the tank 43 that the greater portion of the acid can be decanted off. Only a relatively small portion of the acid will remain occluded in the fines and when these fines and occluded acid are returned to the first settling tank 8, through pump 46, they constitute such a small part of the contents of this tank that their presence in carrying out the initial separation step in the tank 8, as hereinbefore described, does not interfere with efficient separation at this point nor do they interfere with subsequent filtration, as described.

If desired, the residue in the tank 43 may be repulped with acid fed from the tank 12 through pipe 48 to render said residue mobile in order that it may be handled as stated.

It will be noted that the system which has been described is highly economical in acid for the only place where acid may be lost throughout the several steps is at the filter where some acid is removed from the process in the filter cake, but inasmuch as this acid thus removed can be recovered as stated, there is in effect no acid lost. In a vacuum concentrator of the type described, the loss of acid during concentration will be so small as to be utterly negligible.

The system of Figure 2 differs from the system of Figure 1, mainly in the fact that the filtration step which has been described in conjunction with Figure 1 is omitted in the system of Figure 2. In cases where high recovery of acid is not necessary, sulphate residue occluding some acid after repulping may be discharged from our process through pipe 49. Otherwise the systems are substantially the same, so far as apparatus layout is concerned. It may be noted, however, that by including the filtration step as in the system of Figure 1, a greater amount of acid is recovered, although the system of Figure 2 will be entirely satisfactory under practical working conditions for many practical purposes. It is a more simple system, more economically installed and will recover and concentrate a large percentage of the acid therein treated.

As a further modification of this invention, we have found it practical in some instances to take the slurry direct from the concentrators 3 and feed it directly into a filtration step without intermediate separation through stratification. By this modification, we are able to recover very considerable amounts of acid of high concentration from the original solution, although not so great amounts as in the other forms of the invention which we have described. This is made possible by concentration in the manner hereinafter described and during which step the solids are precipitated in large quantities and in a form to permit of satisfactory filtration with a resulting relatively high concentration of the acid. It should be borne in mind in this connection that an appreciable concentration of the acid is essential in order to obtain an acid which is sufficiently free from impurities to permit it to be re-used and in order to obtain this result the relatively high concentration to which we have referred is necessary.

We wish it understood, however, that where the slurry is passed directly from the concentrator to the filter to recover the acid through a filtering operation, the acid thus recovered is thereupon passed to a concentrator such as the concentrator 40 through which it is passed for concentration to the desired extent with attendant precipitation of additional solids which may be subsequently separated from the acid by treatment in the chamber 43. The separated solids are returned to the concentrator 3 to be mixed with the slurry of 55%–60% acid and granular solids.

In the foregoing detailed description of different practical embodiments of our invention, we have described by way of example, the manner in which the process may be carried out in the recovery of sulphuric acid from by-product solutions of manufacture of titanium oxide. We have given these examples in such a clear and explicit manner that they will be clearly understood by those skilled in the art. We are, however, as hereinbefore stated, to be understood that the invention is not limited to the recovery of acid in solutions obtained as a by-product or production of titanium oxide, but that it may be used in conjunction with the recovery of sulphuric acid from other solutions forming by-products in other fields and wherein such solutions include appreciable amounts of iron sulphate and lesser amounts of other sulphates.

In practising the invention in these collateral fields, different temperatures or pressures or both may be required dependent upon conditions, but these factors can be readily modified if a clear understanding of the present invention, as hereinbefore described, is kept in mind. Accordingly, the invention is not restricted to specific details in this connection, but is to be understood as fully commensurate with the appended claims.

It will be noted, however, that the processes which have been described are relatively simple, so far as the systems are concerned. These systems may be economically installed and efficiently operated at relatively low costs as compared with prior practice. The operating and maintenance costs of the system of the present invention are relatively low, while the acid end product is of good quality and high concentration.

Having thus fully described the invention, what we claim as new and desire to secure by Letters Patent is:

1. In the process of recovering sulphuric acid from a sulphuric acid solution of principally iron sulphates, the step which consists in boiling the solution in vacuo at a temperature not exceeding 200° F. and to a concentration of free acid of approximately 60% and for a sufficient period to precipitate out the bulk of the solids in solution, while maintaining such temperature, and with the iron sulphate in the form of crystals of ferrous sulphate monohydrate.

2. In the process of recovering sulphuric acid from a sulphuric acid solution of principally iron sulphates, the step which consists in boiling the solution in vacuo at a temperature not exceeding 200° F. and to a concentration of free acid from approximately 55% to 60% and for a sufficient period to precipitate out the bulk of the solids in solution, while maintaining such temperature, and with the iron sulphate in the form of crystals of ferrous sulphate monohydrate.

3. In the process of recovering sulphuric acid from a sulphuric acid solution of principally iron sulphates, the step which consists in boiling the solution in vacuo at a temperature not exceeding 200° F. and to a concentration of free acid not exceeding 60 per cent for a sufficient period at such temperature as to precipitate out the bulk of the solids in solution and with the iron sulphate in the form of crystals of ferrous sulphate monohydrate.

4. The process of recovering sulphuric acid from a sulphuric acid solution of sulphates comprising boiling the solution in vacuo at a temperature not exceeding 200° F. and to a concentration of free acid not exceeding 60 per cent, for the purpose of precipitating the major portion of the soluble sulphates in solid granular form, thereafter separating the granular solids from the acid, thereafter further concentrating the resulting acid solution with attendant precipitation of further solids, thereafter separating the acid from the thus precipitated solids, and thereafter dissolving the residue of the last separation step in the sulphuric acid solution to be fed to the first concentration step.

5. The process of recovering sulphuric acid from a sulphuric acid solution of sulphates comprising boiling the solution in vacuo at a temperature not exceeding 200° F. and to a concentration of free acid not exceeding from approximately 55 to 60 per cent, for the purpose of precipitating the major portion of the soluble sulphates in solid granular form, thereafter separating the granular solids from the acid, thereafter further concentrating the resulting acid solution with attendant precipitation of further solids, thereafter separating the acid from the thus precipitated solids, and thereafter dissolving the residue of the last separation step in the sulphuric acid solution to be fed to the first concentration step.

6. The process of recovering sulphuric acid from a sulphuric acid solution of iron sulphates, which comprises concentrating the solution, in vacuo, under such temperature as to precipitate, while maintaining such temperature, the major portion of soluble sulphates in the form of readily recoverable ferrous sulphate monohydrate granules, and thereafter separating ferrous sulphate granules from the acid.

7. The process of recovering sulphuric acid from a sulphuric acid solution of iron sulphates, which comprises concentrating the solution, in vacuo, under such temperature as to precipitate, while maintaining such temperature, the major portion of soluble sulphates in the form of readily recoverable ferrous sulphate monohydrate granules, thereafter separating ferrous sulphate granules from the acid, thereafter further concentrating the resulting acid solution with attendant precipitation of further solids, and thereafter separating the acid from the thus precipitated solids.

8. The process of recovering sulphuric acid from a sulphuric acid solution of iron sulphates, which comprises concentrating the solution in vacuo, under such temperature as to precipitate, while maintaining such temperature, the major portion of soluble sulphates in the form of readily recoverable ferrous sulphate monohydrate granules, thereafter separating ferrous sulphate granules from the acid, thereafter further concentrating the resulting acid solution with attendant precipitation of further solids, thereafter separating the acid from the thus precipitated solids, and mixing the residue of the last separation step with sulphuric acid solution to be fed to the first concentration step.

9. The process of recovering sulphuric acid from a sulphuric acid solution of iron sulphates, which comprises concentrating the solution, in vacuo, under such temperature as to precipitate, while maintaining such temperature, the major portion of soluble sulphates in the form of readily recoverable ferrous sulphate monohydrate granules, thereafter separating ferrous sulphate granules from the solution, thereafter further concentrating the thus separated solution to precipitate the remaining relative small portion of residual sulphates in the form of fines, thereafter separating the acid from said fines, and returning the fines, with occluded acid, to the first separation step.

10. The process of recovering sulphuric acid from a sulphuric acid solution of iron sulphates, which comprises concentrating the solution, in vacuo, under such temperature as to precipitate, while maintaining such temperature, the major portion of soluble sulphates in the form of readily recoverable ferrous sulphate monohydrate granules, thereafter permitting the resulting slurry to stratify, thereafter decanting the acid strata, thereafter repulping the residue of the stratification step, thereafter permitting the repulped slurry to stratify, then decanting the acid strata of the last stratification step, and thereafter disposing of the residue of said last stratification step.

11. The process of recovering sulphuric acid from a sulphuric acid solution of iron sulphates, which comprises concentrating the solution, in vacuo, under such temperature as to precipitate, while maintaining such temperature, the major portion of soluble sulphates in the form of readily recoverable ferrous sulphate monohydrate granules, thereafter permitting the resulting slurry to stratify, thereafter decanting the acid strata, thereafter repulping the residue of the stratification step, thereafter permitting the repulped slurry to stratify, then decanting the acid strata of the last stratification step, and filtering the residue to recover further acid therefrom.

12. The process of recovering sulphuric acid from a sulphuric acid solution of sulphates, which comprises concentrating the solution to from 55% to 60% acid and at a temperature of 190° F.–200° F. to precipitate the greater portion of the soluble sulphates in solid, granular form, leaving only relatively small amounts of soluble sulphates in the solution, thereafter separating the thus precipitated granular sulphates from the solution, thereafter further concentrating the resulting solution sufficiently to precipitate substantially all of the remaining relatively small quantity of soluble sulphates therein in the form of fines, thereafter separating the acid from said fines, and returning said fines, with occluded acid, to the first separation step, whereby the said occluded acid may be recovered in the first separation step because of the relatively small quantity of fines involved.

OTTO MANTIUS.
ERNEST MANTIUS.